United States Patent [19]

Isler

[11] Patent Number: 5,322,336
[45] Date of Patent: Jun. 21, 1994

[54] HINGED TONNEAU COVER FOR A PICK-UP TRUCK BED

[76] Inventor: Mark Isler, 8447 Tod Ave., Lordstown, Ohio 44481

[21] Appl. No.: 47,941

[22] Filed: Apr. 19, 1993

[51] Int. Cl.$^5$ ............................................. B60P 7/02
[52] U.S. Cl. .................................. 296/100; 16/252; 16/269; 16/355; 49/397; 49/465
[58] Field of Search .................. 296/100; 16/269, 252, 16/355, DIG. 29, 231, 388; 49/55, 397, 465, 505; 160/369, 371

[56] References Cited

U.S. PATENT DOCUMENTS

| | | | |
|---|---|---|---|
| 2,799,890 | 7/1957 | Stavich | 49/397 X |
| 2,989,340 | 6/1961 | Penner | 296/100 |
| 3,762,762 | 10/1973 | Beveridge et al. | 296/100 |
| 3,785,698 | 1/1974 | Dean et al. | 296/100 |
| 4,083,596 | 4/1978 | Robertson | 296/100 |
| 4,496,184 | 1/1985 | Byrd et al. | 296/100 |
| 4,762,360 | 8/1988 | Huber | 296/100 |
| 5,018,777 | 5/1991 | Swenson et al. | 296/100 |

FOREIGN PATENT DOCUMENTS 2076884 12/1981 United Kingdom .................. 16/355

*Primary Examiner*—Dennis H. Pedder
*Attorney, Agent, or Firm*—Harpman & Harpman

[57] ABSTRACT

A hinged tonneau cover assembly that is used on pick-up truck beds to allow for easy access to the truck bed. The hinged tonneau cover assembly has a lightweight internal perimeter frame that is removably secured to the front of the truck bed by a hinged mounting assembly and self-contained piston and cylinder rods adjustably positioned to the rear of the truck bed. The hinged tonneau cover assembly can be raised at one end for immediate access to the truck bed.

12 Claims, 5 Drawing Sheets

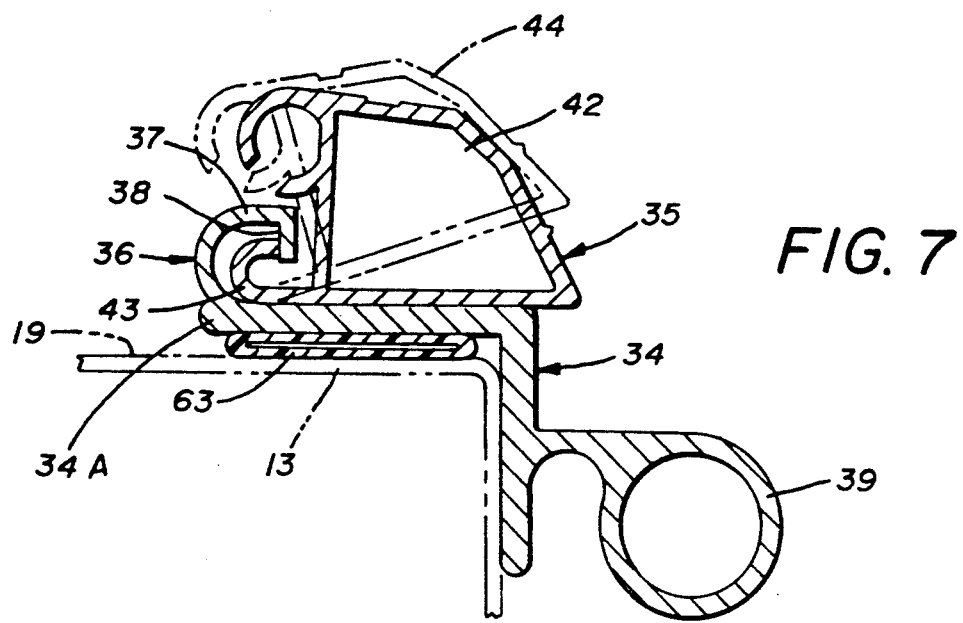
FIG. 7
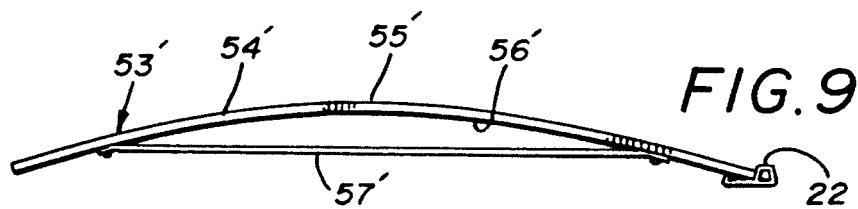
FIG. 9
FIG. 10
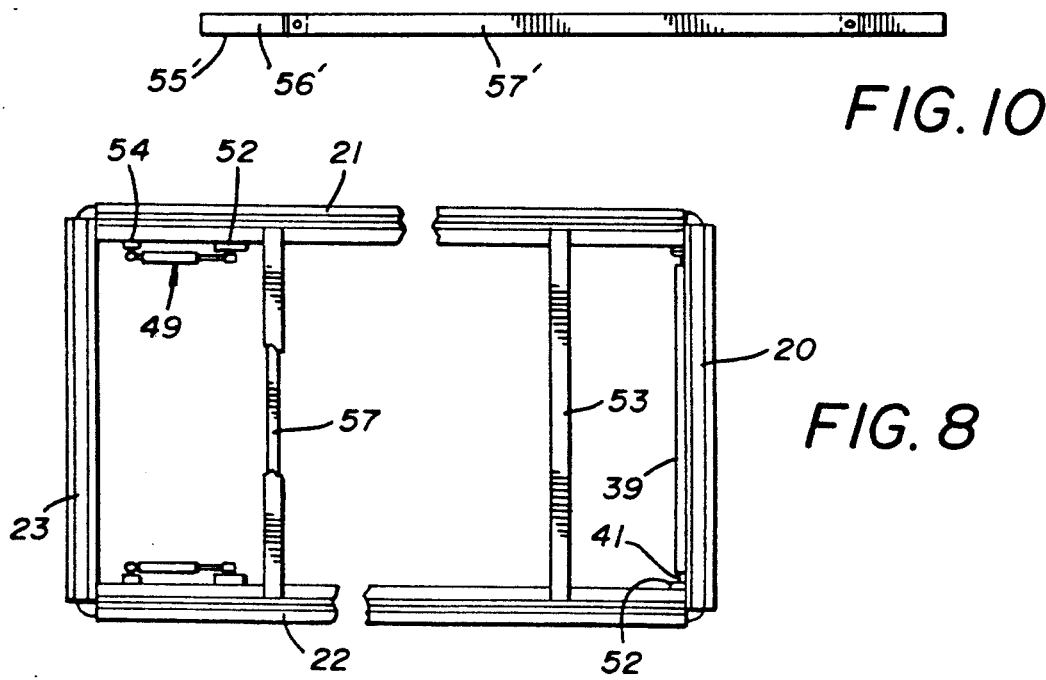
FIG. 8

HINGED TONNEAU COVER FOR A PICK-UP TRUCK BED

BACKGROUND OF THE INVENTION

1. Technical Field

This device relates to truck tonneau covers that use a lightweight perimeter frame around the truck bed over which a canvas cloth material is stretched defining a cover. Heretofore, the canvas cloth cover had to be partially removed from the frame for limited access to the truck bed.

2. Description of Prior Art

Prior art devices of this type have relied on a variety of hard, semi-hard cover elements and frames that were hinged to the truck bed for tilt-up access to the rear of the bed. The covers typically have a spring assembly and support rods to hold the rigid hard cover above the bed with a variety of different cover constructions, hinge elements and supporting assemblies, see for example U.S. Pat. Nos. 2,989,340, 3,762,762, 3,785,698, 4,083,596, 4,762,360 and 4,496,184.

In U.S. Pat. No. 2,989,340 a quick detachable hinged structure is disclosed that uses spring mounted hinge pin assembly bolted to the forward wall of the truck bed and coil spring rods that secure the top to the respective side walls of the bed.

U.S. Pat. No. 3,762,762 is directed towards a cover and lifting mechanism for a pick-up truck wherein a rigid hard top is hinged from the truck bed by a pair of pivoted brackets secured to the bed frame and front wall of the bed with stanchions springs and pin assembly secured to connect the arms to the top.

U.S. Pat. No. 3,785,698 discloses a cover top for a pick-up truck bed wherein a removable hinge cover has an axial hinge with a spring portion and overbearing hook portion. Support rods extend from the rear of the top for sliding registration in a horizontal spring loaded mounting channel in the side walls of the truck bed.

A raiseable topper can be seen in U.S. Pat. No. 4,083,596 in which a solid rigid cover top is hinged to the front wall of the truck bed from a first position, to a second position wherein the cover member is supported substantially above the bed via multiple pivoted spring-loaded support arms extending from each end of the rigid cover to fixed pivot points on the bed.

In U.S. Pat. No. 4,762,360 a de-mountable pick-up truck tonneau cover can be seen wherein spring-loaded pins are mounted on the interior of the cover for releasable engagement with the sides of the cargo box bed so that once the pins are retracted against the springs, the tonneau cover can be fully removed.

Finally, in U.S. Pat. No. 4,496,184 a two-tiered tonneau cover frame is shown that has a lower frame, U-shaped bed engagement frame and an upper elevated U-shaped frame extending therefrom. Canvas material is stretched over the frames in alternate forms of the invention and the frames are pivotally connected to the bed at two opposing pivot points.

SUMMARY OF THE INVENTION

A hinged tonneau cover assembly for pick-up truck beds that hinges from a continuous hinged assembly removably secured at the front wall of the bed to allow for limited access to the bed when raised. The lightweight tonneau cover frame rests on the perimeter walls and tailgate of the truck bed and is held in raised position via self-contained piston and cylinder assembly pivotally secured between the tonneau cover frame and the truck bed side walls.

DESCRIPTION OF THE DRAWINGS

FIG. 7 is an enlarged cross-sectional view of the hinge and mounting assembly with portions broken away on lines 7—7 of FIG. 4;

FIG. 8 is a top plan view of the entire hinged tonneau cover assembly independent of the pick-up truck bed;

FIG. 9 is a side plan view of a cover support bow and reinforcing strip and support frame engagement section;

FIG. 10 is a bottom plan view of the cover support bow and reinforcing strap of FIG. 9;

DESCRIPTION OF THE PREFERRED EMBODIMENT

Figure 1:
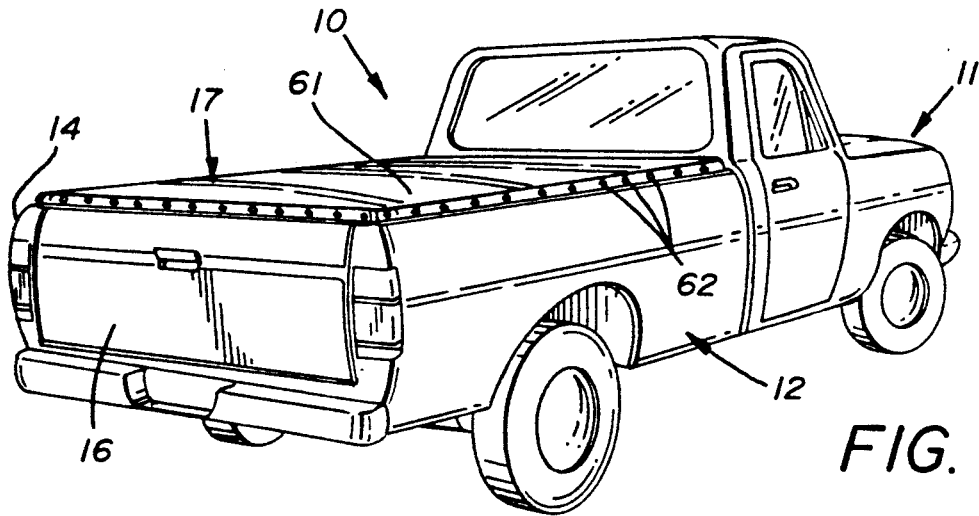
FIG. 1 is a perspective view of a pick-up truck with a hinged tonneau cover support frame assembly thereon in closed position.
Figure 3:
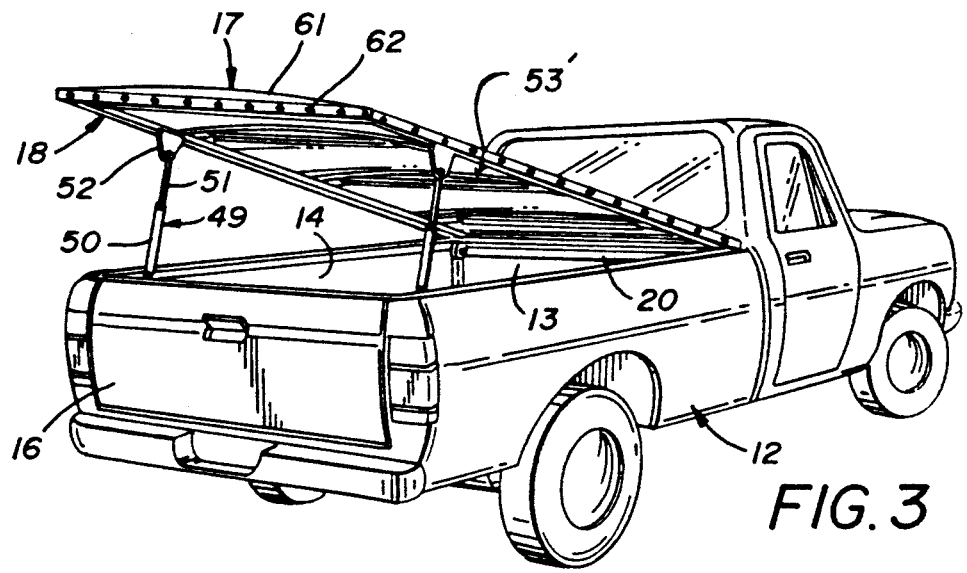
FIG. 3 is a perspective view of a pick-up truck with the hinged tonneau cover support frame assembly thereon in raised bed accessible position.

Referring to FIGS. 1 and 3 of the drawings, a pick-up truck 10 can be seen having a cab portion 11, and a bed portion 12. The bed portion has a front wall 13, oppositely disposed spaced parallel side walls 14 and 15 and a hinged tailgate 16 as is well understood by those skilled in the art. A hinge tonneau cover assembly 17 can be seen having a main support frame 18 removably positioned about the perimeter top edge 19 of the truck bed's front, side walls, and tailgate 13,14,15 and 16 respectively. The main support frame is comprised of an elongated hinge and mounting assembly 20, a pair of spaced parallel elongated side rails 21 and 22 and an interconnecting extrusion element 23 which in combination defines a generally rectangular configuration best seen in FIG. 8 of the drawings.

Figure 4:
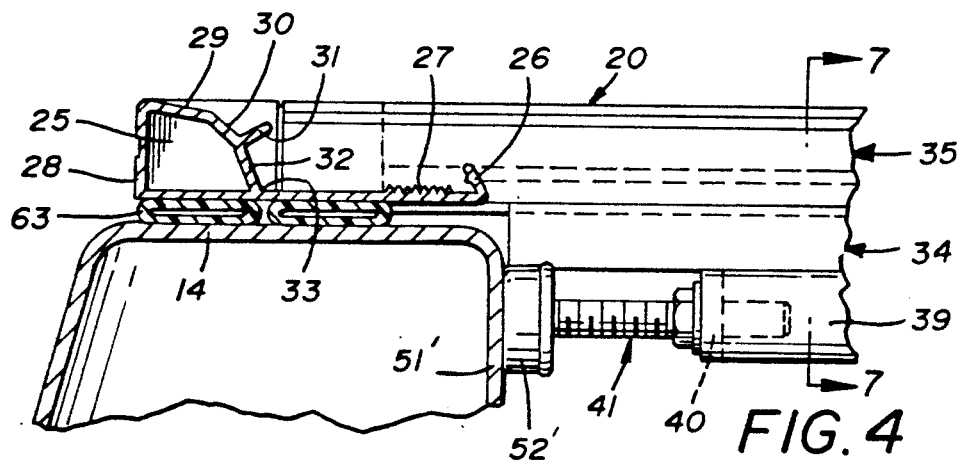
FIG. 4 is an enlarged side plan view of a portion of the truck bed and attached hinge and mounting assembly of the invention.

Each of the side rails 21 and 22 are identical and referring to FIG. 4 of the drawings the side rail 21 can be seen in cross-section having a base 24, an enclosed channel area 25, an opposing disposed upstanding angular flange 26 defining an inside perimeter edge. The base 24 has a plurality of parallel ribs 27 extending longitudinally of said base inwardly of said upstanding angular flange 26. The enclosed channel portion 25 has a vertical outer side wall 28, an integral inclined top 29 extending at right angles therefrom and a first angular descending interior wall 30 extending from said top 29 to an elongated angularly positioned flange element 31 that extends at right angles therefrom. A second angularly disposed descending wall 32 extends from and is integral with said flange element 31 intersecting at 33 with said base 24, thus defining the enclosed channel area 25 and a registering interior interconnecting wall configuration. Referring now to FIGS. 2,4,7, and 8 of the drawings, the hinge and mounting assembly 20 can be seen that secures the hinged tonneau cover assembly 17 within the truck bed 12 and hinges so as to open same to an elevated position illustrated in FIG. 3 of the drawings.

Referring to FIG. 7 of the drawings, the hinge and mounting assembly 20 is comprised of a bearing and mounting element 34 and a hinge element 35. Said bearing and mounting element 34 has an angular base portion 34A that is engaged against the top edge 19 of the front wall 13 of the bed portion 12 illustrated in broken lines. The angular base portion 34A has an upstanding curved flange 36 whose upper portion 37 is in parallel spaced relation to said base portion 34A terminating in a down turned vertically aligned flange 38.

Figure 2:
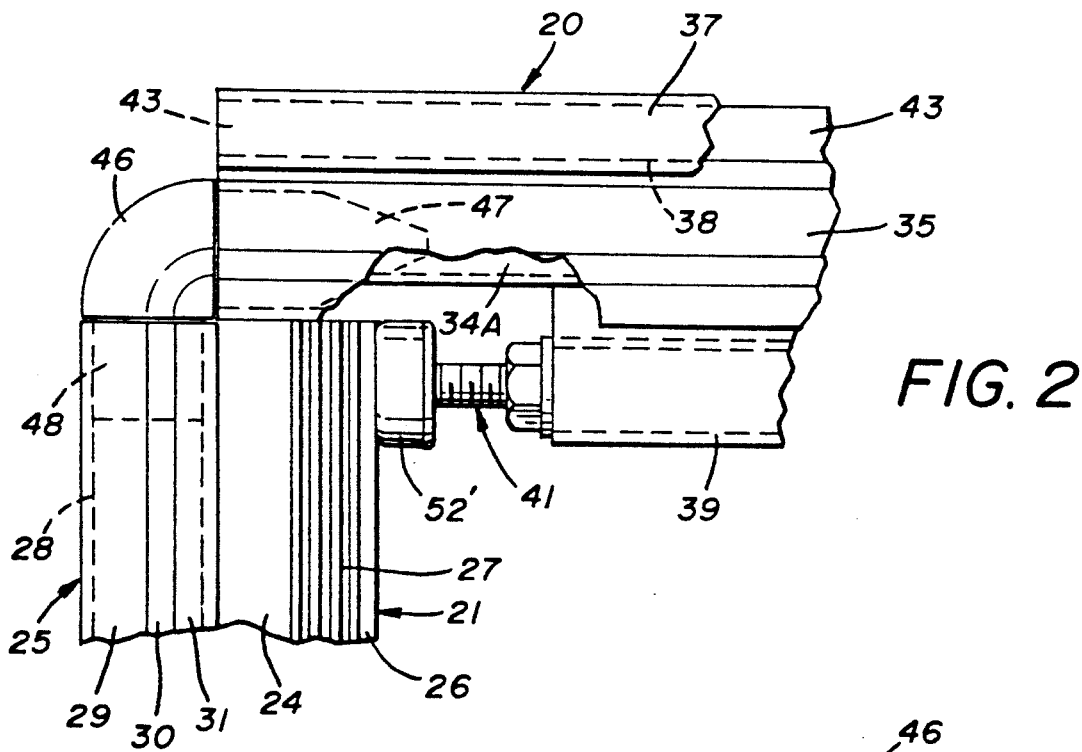
FIG. 2 is an enlarged top plan view of a portion of a hinge and mounting assembly.

The angled base portion 34A has a integral right angular extension defining a mounting tube 39 in horizontally spaced relation thereto. The mounting tube 39 has a threaded insert 40 into which an adjustable bed engagement bolt assembly 41 is threadably positioned as best seen in FIGS. 2 and 4 of the drawings. The hinge element 35 is defined by an elongated enclosed channel 42 with an upstanding hook portion 43 extending rearwardly therefrom and is interengaging with said hereinbefore described upstanding curved flange 36. The hinge element 35 can be pivoted from the upstanding hook portion and flange 43 and 36 respectively as indicated by broken lines at 44 in FIG. 7 of the drawings.

It should be noted that the hinge elements enclosed channel configuration 42 defines an interior interconnecting wall configuration that is identical to said interior wall configuration 24A hereinbefore described.

Figure 11:
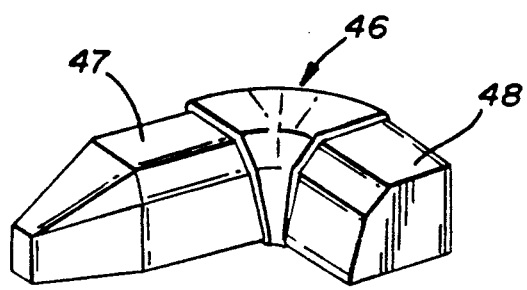
FIG. 11 is an elongated perspective view of a corner connecting pin for the hinge support frame assembly.

Each of said support frame elements 21,22,23 and 20 are joined together by their respective enclosed channel portions 24 and 42 on their adjacent free ends by a corner connector 46, best seen in FIG. 11 of the drawings.

The corner connector 46 has right angularly disposed engagement extensions 47 and 48 that are contoured to register with said interior integral walls 24A and 42 as best seen in broken lines in FIG. 2 of the drawings.

Referring now to figure 3 of the drawings, a pair of frame supporting piston and cylinder assemblies 49 can be seen having a cylinder 50 and a rod 51 which are positioned between said truck bed side walls 13 and 14 and said parallel side rails 21 and 22. A pair of apertured angularly offset inwardly and downwardly mounting brackets 52 extend from said support frame elements 21 and 22 respectively inwardly of said interconnecting extrusion element 23.

Figure 5:
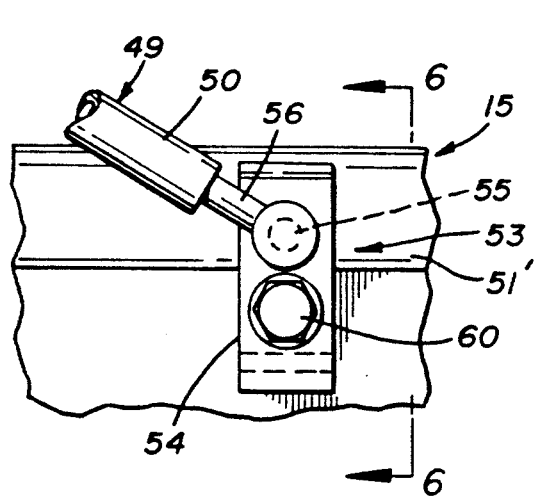
FIG. 5 is an enlarged side plan view of a mounting clamp assembly for the cover support arms secured to a portion of the side wall of the truck bed.
Figure 6:
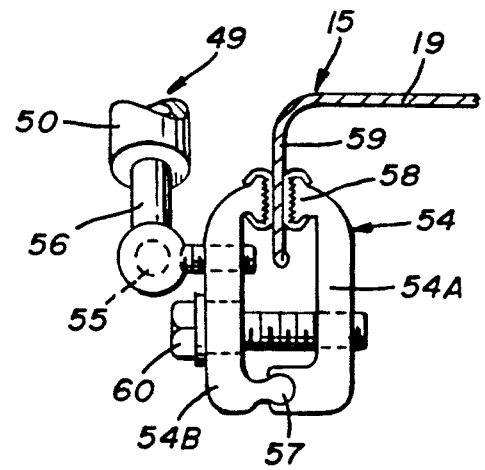
FIG. 6 is an end plan view of the mounting clamp assembly on lines 6—6 of FIG. 5.

Referring to FIGS. 5 and 6 of the drawings a piston and cylinder mounting assembly 53 can be seen comprising a modified C clamp 54 in which is threadably tapped a ball stud 55. The piston and cylinder mounting assembly 53 is pivotally mounted on said ball stud 55 by a mounting arm fitting 56 as will be well known to those skilled in the art. The C clamp 54 has a pair of opposing arms 54A and 54B with respective jaw elements 58 which are movably secured to one another at 57. The C clamp 54 is clamped to a down-turned flange 59 of the respective side walls 14 and 15 via a bolt assembly 60 well known and understood to those skilled in the art.

Referring back to FIGS. 2–4 of the drawings, a portion of the hinge and mounting assembly 20 can be seen installed within the truck bed portion 12. The bed engagement and bolt assembly 41 has a rubber pad fitting 52 on its respective outer ends that engages the respective side walls 14 and 15 of the truck bed portion 12 by rotational advancement holding the hinge and mounting assembly 20 by frictional engagement within.

It will be apparent that the bed engagement and bolt assembly 41 is adjustable in its relative position on the down-turn flange 51 for optimum access to the truck bed 12.

Referring now to FIGS. 9 and 10 of the drawings, a cover support bow 53' can be seen comprised of an elongated extruded rail section 54' having a top surface 55' and bottom surface 56'. The cover support bow 53' is longitudinally flexible upon compression between respective side rails 21 and 22 defining an arcuate path therebetween. A rigid deflection strap 57' is secured to the bow bottom 56' inwardly of the bow's respective free ends indicated at 53'A and 53'B.

The deflection strap 57' strengthens the support bow 53' during use to prevent unwanted deflection of same under air pressure at speed. In use, a canvas cloth cover 61 is stretched over the main support frame 18 and is secured thereto by a plurality of snaps 62 positioned in longitudinal spaced relation to one another on the main support frame 18 as best seen in FIGS. 1 and 3 of the drawings.

Referring now to FIGS. 4 and 7 of the drawings, a resilient gasket configuration 63 is shown secured to said opposing side rails 21 and 22, said hinge and mounting assembly 20 and said interconnecting element 23 (not shown). The resilient gasket configuration 63 provides a moisture and weather seal between the hinged tonneau cover assembly 17 and the truck bed portion 12 during use. The resilient gasket configuration 63 also cushions the truck bed portion 12 from direct contact with the unyielding contact of the main support frame 18.

Figure 12:
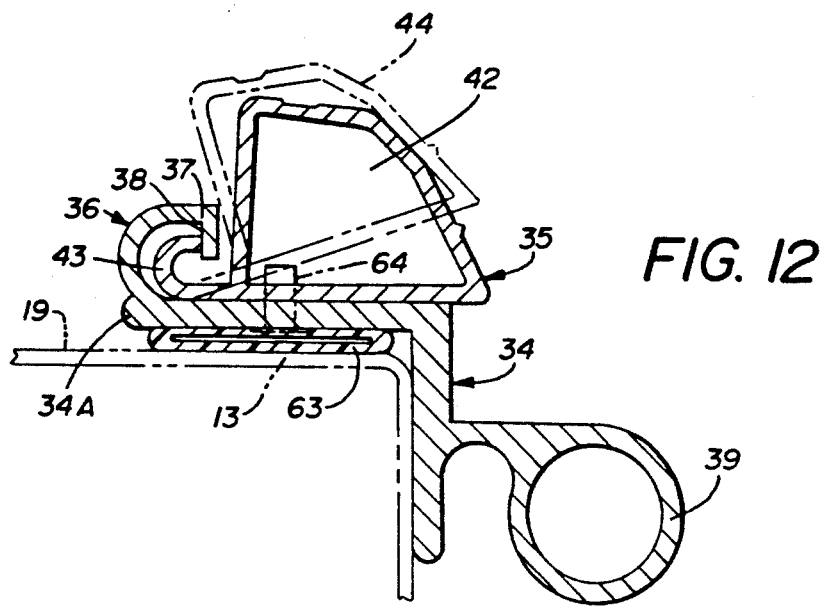
FIG. 12 is an enlarged cross-sectional view of an alternate hinge and mounting assembly.

Referring now to FIG. 12 of the drawings, an alternate form of the invention is shown wherein said hinge element 35 and mounting element 34 have been modified to include a locking pin 64 that is secured to and extends through said base portion 34A in aligned registration with aperture at 65 in the angled base portion 34A.

In operation, when the hinge and mounting assembly 20 is closed (as shown in solid lines) the aligned locking pin 64 prevents longitudinal movement between the respective elements. To remove the hinge element 35 and attached side rails hereinbefore described from the bed portion 12, the supporting piston and cylinder assemblies 49 are released, the hinge element 35 pivoted upwardly (as seen in broken lines) and slid longitudinally away from the mounting element 34 for removal.

Figure 13:
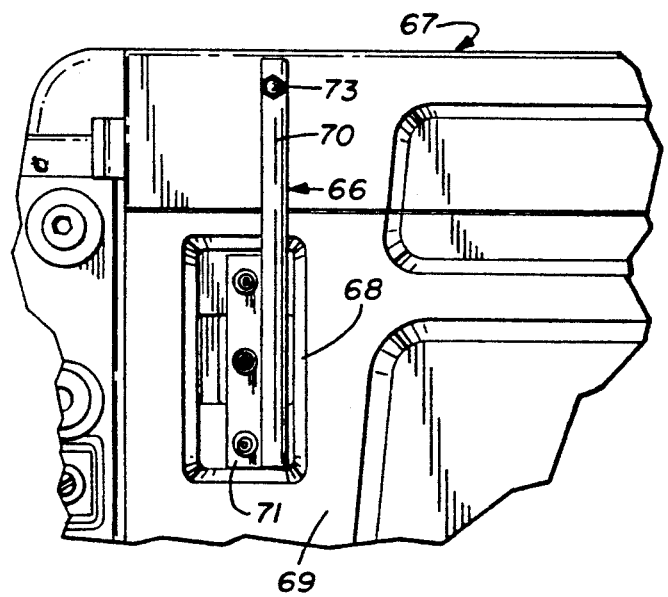
FIG. 13 is an enlarged side plan view of an alternate mounting clamp assembly for the cover support arm secured to a portion of an alternate truck bed.
Figure 14:
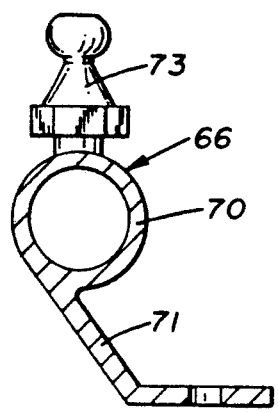
FIG. 14 is an enlarged sectional view on lines 14—14 on FIG. 15.
Figure 15:
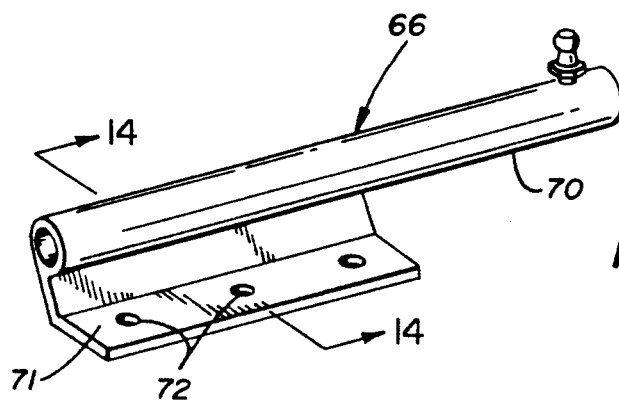
FIG. 15 is a perspective view of an alternate piston and cylinder mounting assembly.

Referring now to FIGS. 13–15 of the drawings, an alternate piston and cylinder mounting assembly 66 can be seen for use on certain truck bodies 67 that do not have the usual downturned flange 59 as seen in FIG. 6 of the drawings.

The truck body 67 of this design have a recessed mounting area 68 and a side wall 69. The alternate piston and cylinder mounting assembly 66 has a main tubular extension 70 with an integral angularly disposed mounting flange 71 extending inwardly from one end and having mounting apertures therein at 72.

A secondary ball stud 73 is secured to said tubular extension 70 in spaced relation to said mounting flange 71. The secondary ball stud 73 is engageable by the mounting arm fitting 56 of the piston and cylinder assemblies as hereinbefore described.

Figure 16:
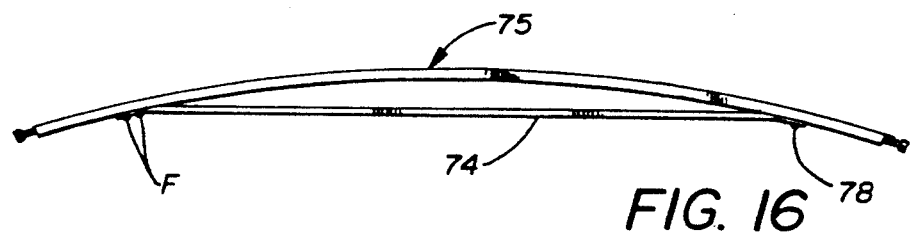
FIG. 16 is a side plan view of an alternate cover support bow and alternate reinforcing strips removably secured thereto.
Figure 17:
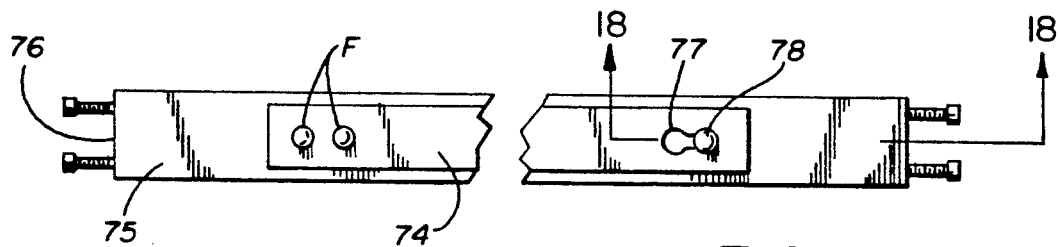
FIG. 17 is a bottom plan view of the alternate cover support bow and reinforcing strap of FIG. 16.
Figure 18:
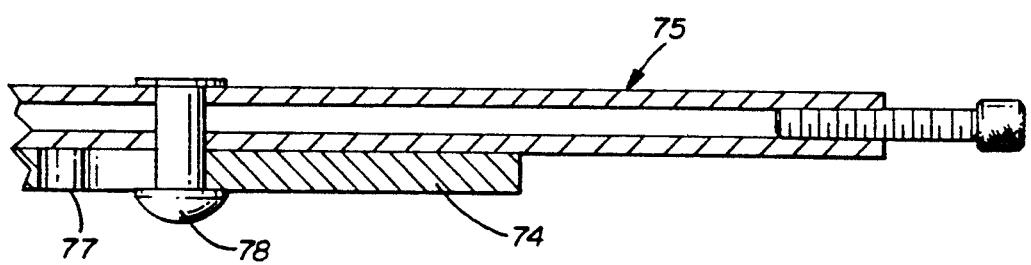
FIG. 18 is an enlarged cross sectional view on lines 18—18 of FIG. 17.

In FIGS. 16–18 of the drawings, an alternate deflector strap 74 can be seen secured to an adjustable bow 75 by multiple fasteners F inwardly of its distal end at 76. The deflection strap 74 has an enlarged aperture at 77 that aligns for fixation over a locking bolt 78 that extends through and is secured to said adjustable bow 75 in oppositely disposed relation to said fasteners F.

In operation, the adjustable bow 75 can be pre-flexed to a rigid arch configuration as best seen in FIG. 15 of the drawings and held there by the engagement of the deflector straps 74 aperture at 77 over the locking bolt 78 as seen in FIGS. 16 and 17 of the drawings.

It will be apparent to those skilled in the art that various changes and modifications may be made thereto without departing from the spirit of the invention, therefore

I claim:

1. A hinged tonneau cover assembly for use on pickup truck beds, said truck beds including, opposing side walls, a front wall and a pivotally supported tailgate, said hinged tonneau cover assembly comprising a main support frame including a hinge and mounting assembly, a pair of opposing side rails with an intersecting element therebetween, said hinge and mounting assembly comprises an elongated bearing and mounting element, a hinge element and means for interconnecting said hinge element to said bearing and mounting element, support bows between said rails, means for bracing said support bows, a mounting tube extending from said bearing and mounting element, an adjustable bed engagement bolt assembly extending from said mounting tube, said means for interconnecting said bearing and mounting element to said hinge element comprising, a curved flange element on said bearing and mounting element, and a hook portion on said hinge element, a secondary down-turned flange extending from said curved flange, said hook portion movably positioned within said curved flange element engaging said secondary down-turned flange, means for selectively positioning said hinge tonneau cover assembly in spaced relation to said tailgate, and means for selectively sealing said hinged tonneau support cover assembly to said truck bed.

2. The hinged tonneau cover assembly of claim 1 wherein said means for bracing said support bows comprises a deflector strap secured to said support bow.

3. The hinged tonneau cover assembly of claim 1 wherein said means for selectively positioning said hinged tonneau cover assembly in spaced parallel relation to said tailgate comprises a piston and cylinder assembly pivotally secured to said support frame and said truck bed.

4. The hinged tonneau cover assembly of claim 1 wherein said main support frame's hinge and mounting assembly, opposing side rails and said interconnecting element therebetween are interconnected to one another at their respective free ends by corner connectors engaged within said respective ends.

5. The hinged tonneau cover assembly of claim 1 wherein said means for selectively sealing said hinged tonneau cover assembly to said truck bed comprises resilient sealing gaskets secured to said main support frame in opposing relation to said truck bed.

6. The hinged tonneau cover assembly of claim 4 wherein said corner connectors have right angularly disposed contoured extensions extending therefrom.

7. The hinged tonneau cover assembly of claim 1 wherein said means for interconnecting said bearing and mounting element to said hinge element also comprises a locking location pin extending from and securing to said bearing and mounting elements, said locking location pin in registered alignment through said hinge element.

8. The hinged tonneau cover assembly of claim 3 wherein said piston and cylinder assembly comprises a piston and cylinder assembly removably secured to one of said opposing side walls and one end of said piston and cylinder assembly, a mounting bracket extending from said main support frame pivotally secured to a remaining end of said piston and cylinder mounting assembly and means for removably securing said piston and cylinder assembly to said one of said opposing side walls.

9. The hinged tonneau cover assembly of claim 8 wherein means for removably securing said piston and cylinder assemblies to said opposing side walls comprises modified C clamp assemblies and piston and cylinder mounting assemblies.

10. The hinged tonneau cover assembly of claim 9 wherein said modified C clamp assembly comprises pairs of opposing arms, jaw elements on said respective arms and a bolt assembly threadably engaging said opposing arms.

11. The hinged tonneau cover assembly of claim 9 wherein said piston and cylinder mounting assembly comprises a tubular extension having an angularly disposed apertured mounting flanges extending therefrom, a ball stud extending from said tubular extension in spaced relation to said apertured mounting flange, and means for securing said mounting flange to said opposing side walls.

12. The hinged tonneau cover assembly of claim 2 wherein said deflector strap has an enlarged aperture inwardly of one end, said enlarged aperture registering on a locking bolt extending from and secured to said support bow.

* * * * *